United States Patent
Giangrasso

(10) Patent No.: US 6,818,579 B2
(45) Date of Patent: Nov. 16, 2004

(54) GRANULAR CERAMIC MATERIAL WITH HIGH POROSITY

(75) Inventor: Antonio Giangrasso, Nürnberg (DE)

(73) Assignee: Pfleiderer Infrastrukturtechnik GmbH & Co. KG, Neumarkt (DE)

( * ) Notice: Subject to any disclaimer, the term of this patent is extended or adjusted under 35 U.S.C. 154(b) by 166 days.

(21) Appl. No.: 10/296,470

(22) PCT Filed: May 7, 2001

(86) PCT No.: PCT/EP01/05151

§ 371 (c)(1),
(2), (4) Date: Nov. 25, 2002

(87) PCT Pub. No.: WO01/85644

PCT Pub. Date: Nov. 15, 2001

(65) Prior Publication Data

US 2004/0011255 A1 Jan. 22, 2004

(30) Foreign Application Priority Data

May 10, 2000 (DE) .......................................... 100 22 798

(51) Int. Cl.⁷ ............................ C01B 33/24; C04B 35/16
(52) U.S. Cl. ............................ 501/80; 501/85; 501/154; 423/332; 423/334
(58) Field of Search ............................ 501/80, 85, 154; 423/332, 334

(56) References Cited

U.S. PATENT DOCUMENTS

| 1,970,280 A | | 8/1934 | Cummins |
| 3,932,140 A | * | 1/1976 | Jayawant et al. .......... 23/293 A |
| 4,011,096 A | * | 3/1977 | Sandell ....................... 106/409 |
| 4,162,166 A | * | 7/1979 | Walls-Muycelo ............ 501/80 |
| 5,710,090 A | | 1/1998 | Dufour |

FOREIGN PATENT DOCUMENTS

| DE | 44 40 931 C2 | 5/1995 |
| DE | 198 33 295 A1 | 8/1999 |

* cited by examiner

Primary Examiner—David Sample
(74) Attorney, Agent, or Firm—Young & Thompson

(57) ABSTRACT

A ceramic material, includes $SiO_2$ and $Na_2O$ and/or $K_2O$. The material is characterized by a porosity of over 60% and by pores, more than 70% of which have a pore size ranging between 0.1 and 15 μm. The ceramic material can be used as filtering material, for water storage and as adsorbent material.

13 Claims, No Drawings

GRANULAR CERAMIC MATERIAL WITH HIGH POROSITY

FIELD OF THE INVENTION

This invention relates to a ceramic material based on $SiO_2$ and $Na_2O$ and/or $K_2O$, a method for its production, and its use, in particular as filter material, water storage, and adsorbent.

BACKGROUND OF THE INVENTION

It is generally known that porous ceramic materials are suitable inter alia as filter materials and may be used as adsorbents. In both cases, the porosity and/or large surface areas of these materials is exploited.

Thus, for example, sand and gravel are used as filter media, where in this case, the individual grains themselves are not porous. Porosity is produced by packing these, achieving permeability for liquids. Since such packing however only gives rise to a relatively small surface area, far greater amounts of sand and gravel are required than in the case of materials the grains of which themselves are porous.

Furthermore, use of activated charcoal as filter material is generally known. Activated charcoal has a relatively large surface area and therefore has good adsorption properties. Due to the very small granule size, however, use of activated charcoal entails a rather high likelihood of filter clogging.

Furthermore, porous plastics, e.g. polyethylenes, may be used, but these materials are not temperature-resistant, and soften when heated (to 80° C. or above).

Due to their porosity and temperature-resistance, clay minerals are also suitable as filter media. However, they have the disadvantage that during filtration clay particles may be released leading to undesired impurities of the filtrate.

Additional prior art ceramics include those used to adsorb and store water. Water storage occurs primarily at the surface of the granule exploiting the water's surface tension. However, water storage is only effective at temperatures of up to room temperature, since at higher temperatures (40° C. and above), water that is adsorbed at the surface evaporates relatively fast.

Expanded clay represents a porous ceramic that likewise is used for water storage. Since these materials, however, lack high porosity, their capacity to adsorb water relative to their own weight is relatively low.

Finally, porous ceramics are not only suitable for water adsorption but also for taking up larger molecules, for example, bacteria. Adsorption of larger molecules such as bacteria requires a pore size of at least 0.1 $\mu$m. Until now, ceramics based on $Al_2O_3$ and $SiO_2$ have been used for this purpose, however, these materials lack high porosity, which limits the number of bacteria adsorbed.

SUMMARY OF THE INVENTION

The object underlying this invention consists of making available a ceramic material with a high adsorption capacity, which therefore is exceptionally suitable for use as filter material, for adsorption and storage of water and for the adsorption of large molecules such as bacteria.

The above-stated object is solved by a ceramic material comprising $SiO_2$ and $Na_2O$, and/or $K_2O$, having a porosity greater than 60% and pores, more than 70% of which have a pore size ranging from 0.1 to 15 $\mu$m.

The ceramic material according to the invention comprises $SiO_2$ and $Na_2O$ and/or $K_2O$. Due to this composition of inorganic oxides, it is heat resistant, and does not decompose even at high temperatures.

The ceramic material according to the invention has a porosity of greater than 60%. Porosity is experimentally determined via pore volume by mercury porosimetry and the true density measured with the aid of a helium pycnometer, and calculated using the following formula:

$$P = V/(1/S+V) \cdot 100\%$$

where P stands for porosity, S for true density, and V for pore volume.

The material according to the invention is further characterized by pores of which at least 70% are of a size ranging from 0.1 to 15 $\mu$m. Pore size distribution was determined with the aid of mercury porosimetry.

In addition, the ceramic material according to the invention may comprise $Al_2O_3$ and also additional oxides such as for example $Fe_2O_3$, MgO, and CaO.

Preferably, more than 95% of the grains of the ceramic material according to the invention have a grain size ranging from 1 to 15 mm, in particular preferably from 5 to 12 mm. Grain size is determined by measuring the grains, e.g. with a slide gauge. Grains that are smaller than 1 mm are not preferred, since their use in filtration may cause a high increase in pressure loss. The preferred upper limit in grain size distribution results from the fact that the surface area relative to volume decreases in larger grains.

Furthermore, the bulk density of the ceramic material according to the invention ranges preferably from 0.2 to 1.0 $g/cm^3$, in particular preferably from 0.3 to 0.5 $g/cm^3$. Bulk density is determined by filling the ceramic material according to the invention into a container having a 1-liter volume. Subsequently, the container filled with one liter of ceramic material is weighed such that the weight quantity of the ceramic material per liter may be ascertained.

Preferably, the ceramic material further has a bulk surface area ranging from 350 to 1500 $m^2/l$. Bulk surface area means that surface area which results from the product of surface area of the ceramic material itself and the bulk density of the ceramic material, where the surface area of the ceramic material according to the invention is determined via nitrogen porosimetry and the adsorption isotherm is analyzed according to the BET method.

The ceramic material according to the invention is produced according to a method comprising the following steps:

(a) pelleting a mixture comprising 1.0 parts by weight of ceramic raw material, which comprises more than 40% by weight of $SiO_2$ and 0.5 to 10% by weight of $Na_2O+K_2O$, and 0.5 to 1.5 parts by weight of aqueous binding agent, comprising water and water glass having a weight ratio of water to water glass ranging from 95:5 to 55:45

(b) drying and sintering the grains obtained in step (a).

The production method according to the invention is more closely described below relative to the individual production steps.

In step (a), a ceramic raw material is used which comprises more than 40% by weight of $SiO_2$ and 0.5 to 10% by weight of $Na_2O+K_2O$. In a preferred embodiment, the ceramic raw material comprises 60 to 90% by weight of $SiO_2$. In addition, the ceranic raw material may contain $Al_2O_3$ and additional oxides such as for example $Fe_2O_3$, MgO and CaO. Furthermore, in a preferred embodiment, the ceramic raw material comprises diatomaceous earth. In a particularly preferred embodiment, the ceramic raw material is a diatomaceous earth comprising 70 to 90% by weight of $SiO_2$, 0.5 to 4% by weight of $Na_2O+K_2O$ and 4 to 10% by weight of $Al_2O_3$.

As an additional component of the mixture in step (a), an aqueous binding agent is used which comprises water and water glass having a weight ratio of water to water glass ranging from 95:5 to 55:45, preferably 75:25, where water glass may comprise sodium water glass and/or potassium water glass and/or calcium water glass. In a particularly preferred embodiment, water glass comprises 8 to 10% by weight of $Na_2O$, 26 to 32% by weight of $SiO_2$, the remainder being water.

The mixture that is pelleted comprises 1.0 parts by weight of ceramic raw material and 0.5 to 1.5 parts by weight of aqueous binding agent. In a preferred embodiment, the ratio of ceramic raw material to aqueous binding agent is applied in the range of from 1:0.8 to 1:1.2, and especially preferred in a range of from 1:0.9 to 1:1.1.

The mixture of aqueous binding agent and ceramic raw material is pelleted on a pelletizing disk such that grains are obtained of which preferably more than 95% are of a size ranging from 1 to 15 mm, of an especially preferred size ranging from 5 to 12 mm. The properties of the grains may be influenced in particular by the angular set-up of the pelletizing disk, its ratio of edge height, and its rotational velocity.

The grains produced in step (a) are dried and sintered in step (b). In a preferred embodiment, these grains are initially dried by continuous heating from room temperature to 650° C., and subsequently sintered at 650° C. (initial temperature) to 1000° C.–1200° C. (final temperature). Subsequently, in a step (c), the granules may be graded to a size ranging from 1 to 15 mm. Grading occurs via mechanical sieving using for example a linearly vibrating screen or a tumbler screen.

Due to its high degree of porosity, ceramic material according to the invention is suited for filtration of liquids, in particular of water.

Furthermore, the high degree of porosity of the ceramic material may be exploited for water storage. Whereby ceramic material according to the invention has a water adsorption capacity of greater than 70% of its own dead weight. Due to the property of storing water to a high degree, ceramic materials according to the invention may for example be used for watering plants in hot and arid areas. The stored water is released very slowly into the environment such that the drying out of a plant may be avoided. Moreover, also other hydrophilic liquids such as alcohols may be adsorbed by ceramic materials according to the invention.

Ceramic materials according to the invention may furthermore be used for adsorption of large molecules such as bacteria. In addition, the adsorption of similarly large molecules is conceivable such as, for example, polymers with corresponding molecular weights. In the following, the invention will be explained more closely by means of two examples.

DETAILED DESCRIPTION OF THE INVENTION

EXAMPLE 1

For the production of pelleting fluid, sodium water glass composed of 8.2% by weight of $Na_2O$, 27.3% by weight of $SiO_2$, and 64.5% by weight of $H_2O$ is dissolved in water in a weight ratio of water to water glass of 75:25. The pelleting fluid produced in this manner is mixed on a pelletizing plate at an influx throughput of 20 l/h with a diatomaceous earth comprising 84% by weight of $SiO_2$, 5.8% by weight of $Al_2O_3$, 2.7% by weight of $Fe_2O_3$, 1.4% by weight MgO+ CaO and 0.7% by weight of $Na_2O+K_2O$, which is delivered to the pelletizing plate at an influx throughput of 20 kg/h. Pelleting is carried out on a pelletizing plate with an edge height ratio of H/D=0.28. During pelleting, the plate is tilted at 50°±5° and rotated at 6 to 7 rotations per minute giving rise to granules more than 95% of which are of a size in the range of 6 to 12 mm. The granules produced in this manner are placed through a 12 m long rotational furnace with six meters of heating zone and six meters of cooling zone at a velocity of 1 m/min. In this manner, the samples are dried by continuous heating within a temperature range from room temperature to 650° C., then sintered at a temperature ranging from 650° to 1100° C., and finally cooled to room temperature.

The physical data on the resulting ceramic is compiled in Table 1.

EXAMPLE 2

In order to produce the pelleting fluid, sodium water glass composed of 8.2% by weight $Na_2O$, 27.3% by weight $SiO_2$ and 64.5% by weight $H_2O$ is dissolved in water with a weight ratio of water to water glass equal to 95:5. The resulting pelleting fluid is mixed at an influx throughput of 20 l/h on a pelletizing plate with diatomaceous earth comprising 75% by weight of $SiO_2$, 9.0% by weight of $Al_2O_3$, 6.0% by weight of $Fe_2O_3$, 2.5% by weight of CaO, 1.0% by weight of MgO, and 2.5% by weight of $Na_2O+K_2O$, which is delivered to the pelletizing plate at an influx throughput of 25 kg/h. Pelleting is carried out on a pelletizing plate with an edge height ratio of H/D=0.28. During pelleting, the plate is tilted at 60°±5° and rotated at 6 to 7 rotations per minute giving rise to granules more than 95% of which are of a size in the range of 1 to 15 mm. The granules produced in this manner are placed through a 12 m long rotational furnace with six meters of heating zone and six meters of cooling zone at a velocity of 1 m/min. In this manner, the samples are dried by continuous heating within a temperature range from room temperature to 650° C., then sintered at a temperature ranging from 650° to 1100° C., and finally cooled to room temperature.

The physical data on the resulting ceramic is compiled in Table 1.

TABLE 1

| Property | Example 1 | Example 2 |
| --- | --- | --- |
| porosity [%] | 62.7 | 63.7 |
| percentage of pores of a size ranging from 0.1 to 15 $\mu$m [%] | 74 | 94 |
| pore volume [cm$^3$/g] | 0.73 | 0.72 |
| BET surface [m$^3$/g] | 0.9 | 3.5 |
| bulk density [g/cm$^3$] | 0.42 | 0.42 |
| bulk surface [m$^3$/L] | 378 | 1470 |

What is claimed is:

1. Granular ceramic material comprising $SiO_2$ and $Na_2O$ and/or $K_2O$, characterized by a porosity of greater than 60% and pores more than 70% of which are of a size between 0.1 and 15 $\mu$m.

2. Ceramic material according to claim 1, characterized in that it also contains $Al_2O_3$.

3. Ceramic material according to claim 1, characterized in that the size of more than 95% of the granules is in the range of 1 to 15 mm.

4. Ceramic material according to claim 1, characterized in that its packing has a bulk density in the range of 0.2 to 1.0 g/cm$^3$.

5. Ceramic material according to claim 1, characterized in that its packing has a bulk surface area in the range of 350 and 1500 m$^2$/l.

6. A method for producing ceramic material according to claim 1, characterized by the following production steps:
   (a) pelleting of a mixture comprising
       1.0 parts by weight of ceramic raw material, comprising more than 40% by weight $SiO_2$ and 0.5 to 10% by weight of $Na_2O+K_2O$, and 0.5 to 1.5 parts by weight of aqueous binding agent, comprising water and water glass with a weight ratio of water to water glass in the range of 95:5 to 55:45

(b) drying and sintering the granules resulting from step (a).

7. A method for producing ceramic material according to claim 6, characterized in that the ceramic raw material contains 1 to 10% by weight of $Al_2O_3$.

8. A method for producing ceramic material according to claim 7, characterized in that the ceramic raw material comprises a diatomaceous earth.

9. A method for producing ceramic material according to claim 8, characterized in that the diatomaceous earth comprises 70 to 90% by weight $SiO_2$, 0.5 to 4% by weight $K_2O+Na_2O$, and 4 to 10% by weight $Al_2O_3$.

10. A method for producing ceramic material according to claim 6, characterized in that the waterglass comprises 8 to 10% by weight $Na_2O$, 26 to 32% by weight $SiO_2$, the remainder being water.

11. A method for producing ceramic material according to claim 6, characterized in that the ratio of ceramic raw material to aqueous binding material be in the range of from 1:0.8 to 1:1.2.

12. A method for producing ceramic material according to claim 6, characterized in that step (b) comprise drying within the temperature range from room temperature to 650° C. and subsequent sintering at 650° C. (initial temperature) to 1000 to 1200° C. (final temperature).

13. A method for producing ceramic material according to claim 6, characterized in that in step (c), the sintered granules are graded to a size of 1 to 15 mm.

* * * * *